US012696225B2

(12) United States Patent
Zhang et al.

(10) Patent No.: US 12,696,225 B2
(45) Date of Patent: Jul. 28, 2026

(54) UE UPLINK TIMING FOR NON-TERRESTRIAL NETWORKS

(71) Applicant: Intel Corporation, Santa Clara, CA (US)

(72) Inventors: Meng Zhang, Beijing (CN); Andrey Chervyakov, Nizhny Novgorod (RU); Rui Huang, Beijing (CN); Hua Li, Arlington, VA (US); Ilya Bolotin, Nizhny-Novgorod (RU)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 18/280,148

(22) PCT Filed: Mar. 30, 2022

(86) PCT No.: PCT/US2022/022518
§ 371 (c)(1),
(2) Date: Sep. 1, 2023

(87) PCT Pub. No.: WO2022/212482
PCT Pub. Date: Oct. 6, 2022

(65) Prior Publication Data
US 2024/0155536 A1     May 9, 2024

Related U.S. Application Data

(60) Provisional application No. 63/169,622, filed on Apr. 1, 2021.

(51) Int. Cl.
H04W 64/00     (2009.01)
H04W 56/00     (2009.01)
H04W 84/06     (2009.01)

(52) U.S. Cl.
CPC ....... *H04W 64/00* (2013.01); *H04W 56/0045* (2013.01); *H04W 56/009* (2013.01); *H04W 84/06* (2013.01)

(58) Field of Classification Search
None
See application file for complete search history.

(56) References Cited

U.S. PATENT DOCUMENTS 8,538,327 B2     9/2013   Wilkus et al.
2020/0367187 A1*   11/2020   Palenius ........... H04W 56/0045
2023/0388007 A1*   11/2023   Löhr ................. H04B 7/18543

FOREIGN PATENT DOCUMENTS

WO     WO-2019217026 A1     11/2019
WO     WO-2022212482 A1     10/2022

OTHER PUBLICATIONS

"International Application Serial No. PCT US2022 022518, International Preliminary Report on Patentability mailed Oct. 12, 2023", 7 pgs.

(Continued)

*Primary Examiner* — Suhail Khan
(74) *Attorney, Agent, or Firm* — Schwegman Lundberg & Woessner, P.A.

(57)     ABSTRACT

An apparatus and system for setting an uplink timing advance (TA) for a non-terrestrial network (NTN) user equipment (UE) are described. The NTN UE estimates and updates a UE-specific TA value each period. The update is based on Global Navigation Satellite System (GNSS) positions and satellite ephemeris information. The NTN UE adjusts the UE-specific TA gradually, between a predetermined minimum and maximum aggregate adjustment rate.

20 Claims, 6 Drawing Sheets

(56) References Cited

OTHER PUBLICATIONS

"U.S. Appl. No. 18/280,148, Supplemental Preliminary Amendment filed Nov. 25, 2023", 6 pages.
"European Application Serial No. 22782082.6, Response to Communication pursuant to Rules 161(1) and 162 EPC filed Apr. 19, 2024", 9 pgs.
"Japanese Application Serial No. 2023-558966, Notification of Reasons for Refusal mailed Nov. 26, 2024", w English translation, 10 pgs.
"European Application Serial No. 22782082.6, Extended European Search Report mailed Jan. 23, 2025", 10 pgs.
"3rd Generation Partnership Project; Technical Specification Group Radio Access Network; Solutions for NR to support non-terrestrial networks (NTN) (Release16)", 3GPP Standard; Technical Report; 3gpp Tr38.821, 3rd Generation Partnership Project (3GPP), Mobile Competence Centre ; 650, Route Des Lucioles ; F-06921 Sophia-Antipolis Cedex ; France vol. RAN Wg3, No. V16.0.0, [Online]. Retrieved from the Internet: URL : ftp : ftp.3gpp.orgSpecs archive 38_series 38.821 38821-gOO.zip 38821-g00.doc, (Jan. 16, 2020), 1-140.
"Japanese Application Serial No. 2023-558966, Response filed Feb. 25, 2025 to Notification of Reasons for Refusal mailed Nov. 26, 2024", W English Claims, 17 pgs.
CMCC, "Discussion on NTN timing requirements", 3GPP Draft; R4-2100819, 3rd Generation Partnership Project (3GPP), Mobile Competence Centre ; 650, Route Des Lucioles ; F-06921 Sophia-Antipolis Cedex ; France vol. Ran Wg4, No. Electronic Meeting, [Online]. Retrieved from the Internet: URL:https: ftp.3gpp.org tsg_ran WG4_RadioTSGR4_98_e Docs R42100819.

zipR42100819Discussion on NTN timingrequirements-vl.doc, (Jan. 15, 2021), Jan. 25, 2021-Feb. 5, 2021.
Delattre, Sylvain, "The GALILEO Return Link Service Operational Concept", GNSS 2019—Proceedings of the 32nd International Technical Meeting of the Satellite Division of the Institute of Navigation (ION GNSS+ 2019), The Institute of Navigation, 8551 Rixlew Lane Suite 360 Manassas, VA 20109, USA, (Sep. 20, 2019), 1566-1582.
"European Application Serial No. 22782082.6, Response filed Jul. 24, 2025 to Extended European Search Report mailed Jan. 23, 2025", 17 pgs.
"Japanese Application Serial No. 2023-558966, Notification of Reasons for Rejection mailed Apr. 30, 2025", W/English Translation, 6 pgs.
"Japanese Application Serial No. 2023-558966, Response filed Jul. 24, 2025 to Notification of Reasons for Rejection mailed Apr. 30, 2025", w/ English Claims, 6 pgs.
"3GPP; TSG RAN; Solutions for NR to support non-terrestrial networks (NTN) (Release 16)", 3GPP TR 38.821, V16.0.0, (Jan. 16, 2020).
"International Application Serial No. PCT/US2022/022518, International Search Report mailed Jul. 13, 2022", 3 pgs.
"International Application Serial No. PCT/US2022/022518, Written Opinion mailed Jul. 13, 2022", 5 pgs.
Ericsson, "Report of email discussion [107bis#67] [NR-NTN]", 3GPP TSG-RAN WG2 Meeting #108, Reno, Nevada, US, (Nov. 22, 2019), 15 pgs.
Thales, "Feature lead Summary on enhancements on UL time and frequency synchronization for NR NTN", R1-2007217, 3GPP TSG-RAN WG1 Meeting #102-e, e-Meeting, (Aug. 26, 2020), 54 pgs.
"Japanese Application Serial No. 2023-558966, Notification of Reasons for Refusal mailed Sep. 9, 2025", w/ English Translation, 6 pgs.

* cited by examiner

400

402
Determine GNSS position

404
Determine Satellite
Ephemeris Information

406
Estimate TA value For
UL Transmission Timing

UE UPLINK TIMING FOR NON-TERRESTRIAL NETWORKS

PRIORITY CLAIM

This application is a U.S. National Stage Filing under 35 U.S.C. 371 from International Application No. PCT/US2022/022518, filed Mar. 30, 2022 and published in English as WO 2022/212482 on Oct. 6, 2022, which claims the benefit of priority to U.S. Provisional Patent Application 63/169,622, filed Apr. 1, 2021, which is incorporated herein by reference in its entirety.

TECHNICAL FIELD

Embodiments pertain to new radio (NR) wireless communications. In particular, some embodiments relate to uplink timing operations in NR wireless networks.

BACKGROUND

The use and complexity of new radio (NR) wireless systems, which include $5^{th}$ generation (5G) networks and are starting to include sixth generation (6G) networks among others, has increased due to both an increase in the types of devices UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
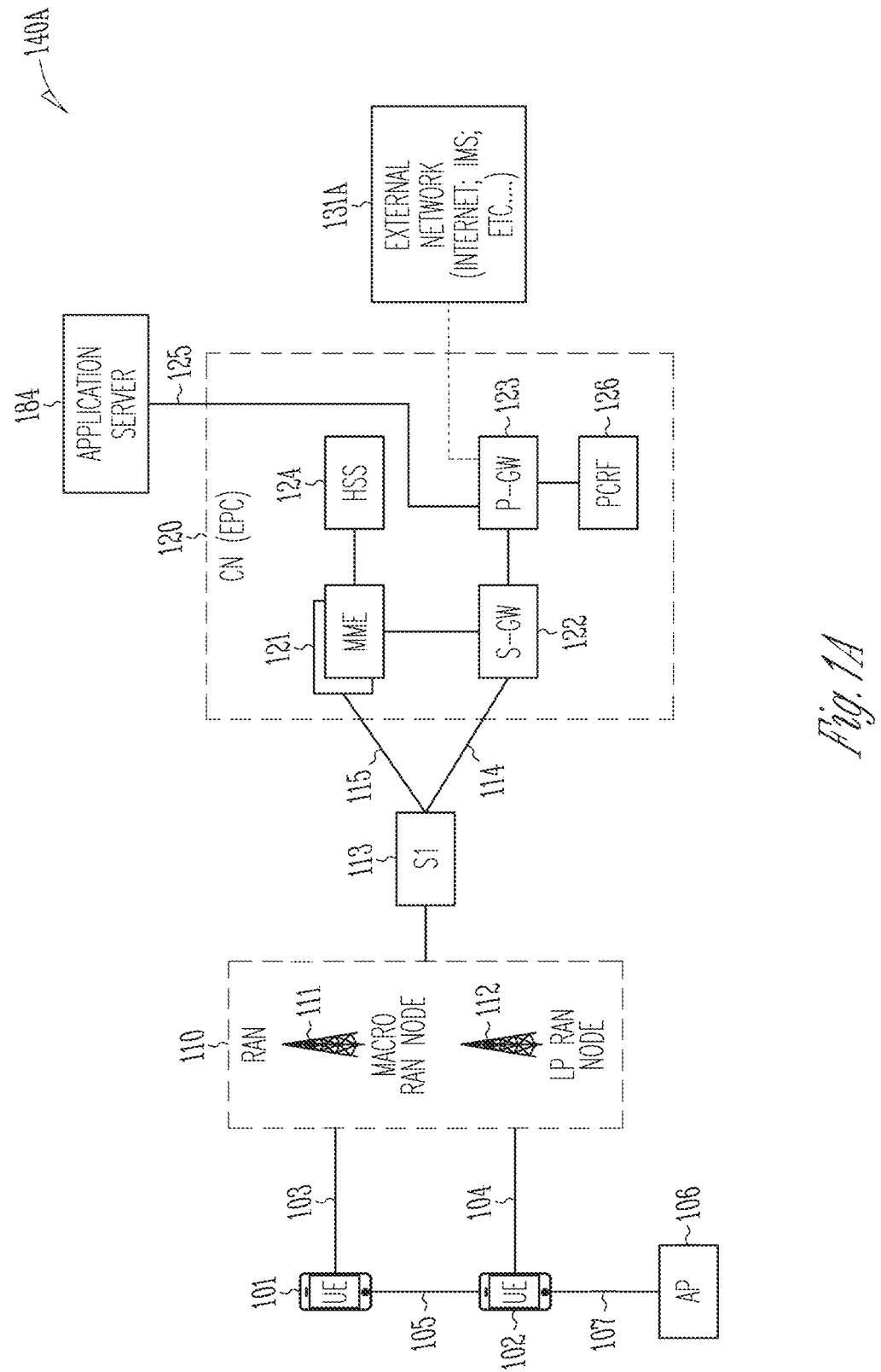
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation (5th or 6th generation) NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW)

122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/ 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMF s, not shown), and N22 (between AMF 132 and NSSF 142, not shown). Other reference point representations not shown in FIG. 1B can also be used.

Figure 1C:
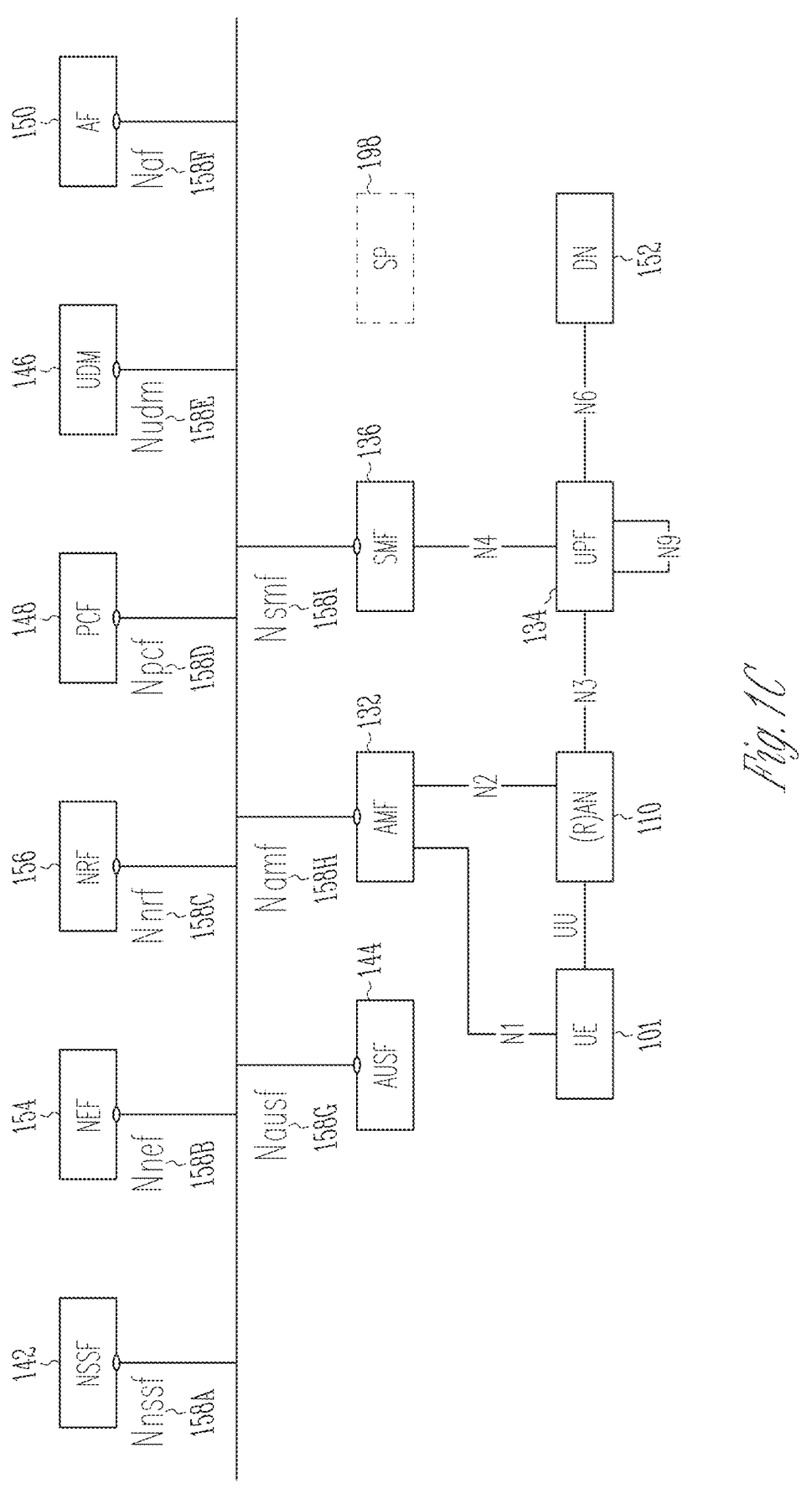
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
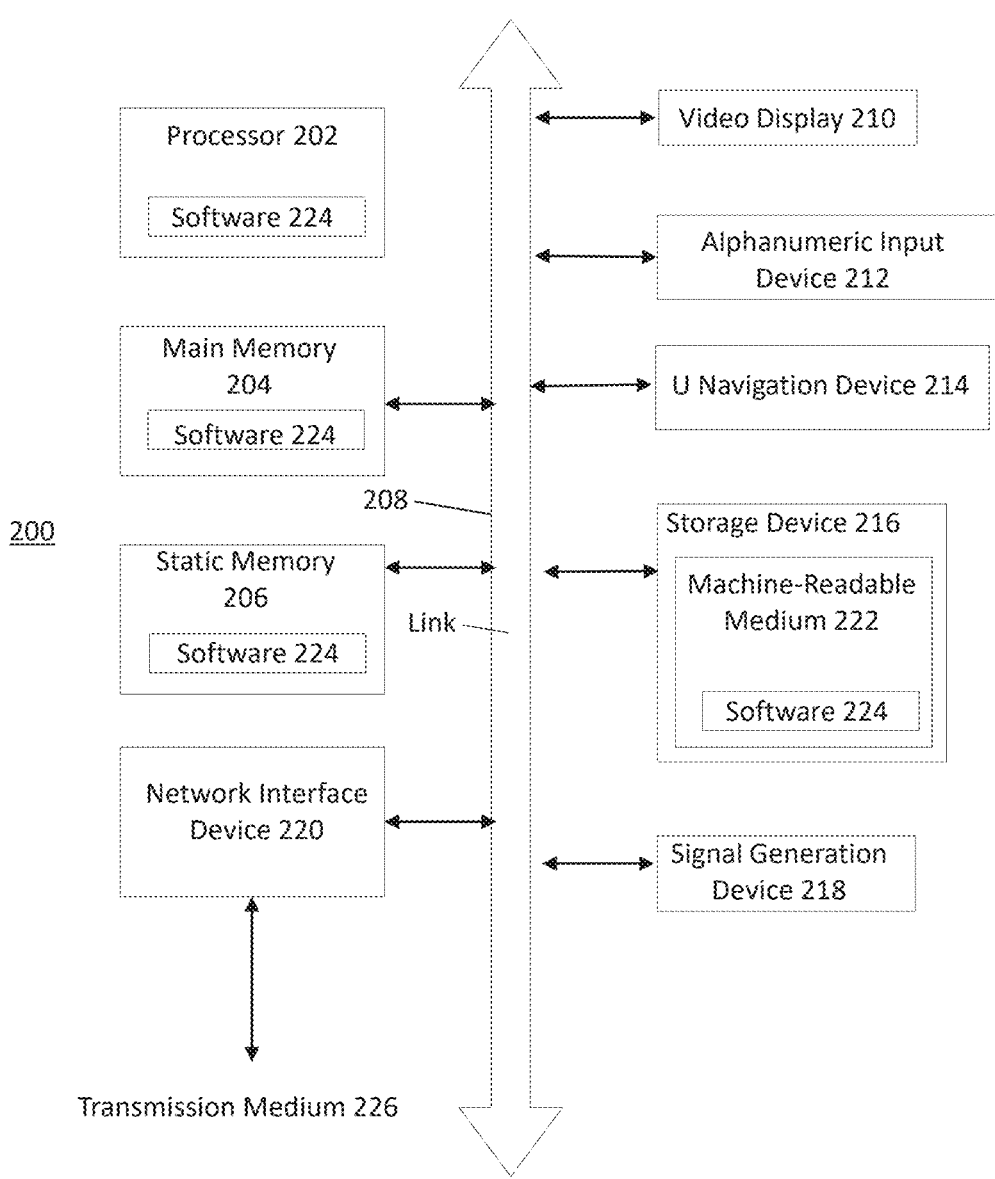
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925

MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/ CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/Wi-Gig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

In closed loop (or initial) adjustment, a Timing Advance Command (TAC) is a command sent by the gNB to the UE. The TAC includes a TA for the UE to adjust uplink transmission timing. This enables the UE to send an uplink transmission (e.g., PUSCH, PUCCH, SRS) in advance to enable transmissions from all UEs to reach the gNB using a common time, thereby permitting the gNB to schedule various uplink transmissions from the UEs appropriately.

In open loop adjustment, the UE may adjust the TA based on the distance (and orientation) with respect to the gNB. The UE may then transmit the uplink transmission using the adjusted uplink TA value. Accordingly, the UE may autonomously adjust the uplink TA value without performing a TA procedure.

Figure 3:
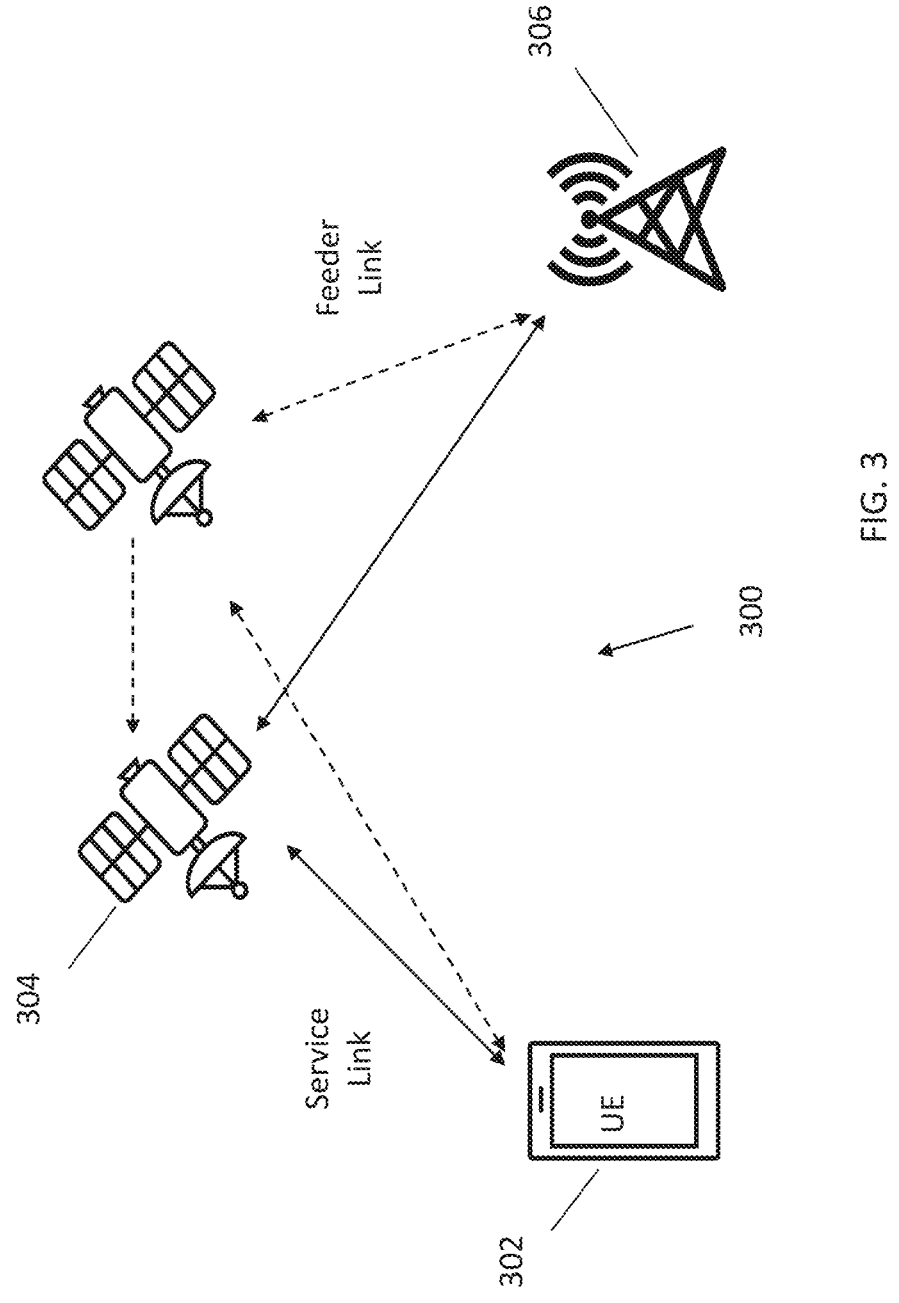
FIG. 3 illustrates a communication system in accordance with some embodiments.

As above, one issue that has increased in importance recently is the timing for interactions between UEs and the network (e.g., gNB) when the communications involve a Non-Terrestrial Network (NTN) UE. NTN UE may communicate with, e.g., low- or medium-earth orbit satellites or geostationary earth orbit satellites. FIG. 3 illustrates a communication system in accordance with some embodiments. The system 300 includes an NTN UE 302 in communication with a gNB 306 through an satellite 304. The communications include communications between the NTN UE 302 and the satellite 304 through a service link, and between the satellite 304 and gNB 306 through a feeder link.

In particular, UL timing operations are based on the assumption that the reference point for system timing procedures lies somewhere between the satellite 304 and the gNB 306. Under such circumstances, the NTN UE 302 uses an estimated UE-specific TA and a configured common TA from the gNB 306 to derive the UL timing. In 3 GPP RAN4, the timing requirements for all related timing procedures were specified, as were dedicated timing requirements for UE-specific TA estimation and update, and the corresponding timing adjustment procedure.

In NR NTN systems, the UE 306 derives its UL transmit timing according to the below function:

$$T_{TA} = (N_{TA} + N_{TA,UE\text{-}specific} + N_{TA,common} + N_{TA,offset}) \times T_c$$

where $N_{TA,common}$ is a common TA configured from the network to indicate to the UE the round trip time (RTT) of the feeder link after gNB compensation from the reference point; $N_{TA,UE-specific}$ is the UE-specific TA for the service link estimated by the UE itself based on at least the UE position determined by the Global navigation satellite system (GNSS) and satellite ephemeris information; $N_{TA}$ and $N_{TA,offset}$ are NR system variables in which $N_{TA}$ is a measured value sent to the UE in the medium access control (MAC) control element (CE) and $N_{TA,offset}$ is based on information in the n-TimingAdvanceOffset field of an RRCReconfiguration or SIB1 message; Tc is 0.509 ns (the basic time unit for the 5G NR system). Note that this function applies to both open loop (the UE adjusts the TA autonomously) and closed loop (the gNB indicates that TA is needed) TA updates.

RAN4 is to define corresponding UL timing requirements and eventually specify the test requirements to guarantee fair UE timing accuracy performance and further, guarantee fair system demodulation performance. In general, the UE derives the portion of the TA that covers the propagation from itself to the satellite (i.e., the service link) while the network determines the remaining portion of the propagation and informs the UE by the common TA (after compensation) (i.e., the feeder link).

Specifically, each part of this UL timing procedure that uses a dedicated UE operation is provided radio resource management (RRM) requirements. In particular, there are several options on how to define the UE specific TA timing requirements:

Option 1: Define the requirements on UE transmit timing error limit. In this case, the UE-specific TA error may be subsumed in the UE transmit timing error.

Option 2: Define the requirements on UE timing advance adjustment accuracy, and UE specific TA error may be subsumed in the timing advance adjustment accuracy.

Option 3: Define the requirements on UE-specific TA error or accuracy. The error and accuracy may be derived from the accuracy of UE GNSS-acquired position and the serving satellite position and related calculations.

In some cases, option 1 may be problematic as the Te requirements only apply to the first transmission but for other UL transmissions there is no requirement if there is no TA update from the MAC CE. In NTN systems however, it is beneficial for the UE to update its TA estimation every period due to satellite-UE relative mobility.

Similarly, option 2 may be problematic as, due to the rather long RTT between the gNB and UE, the updates of UE-specific estimated TA and the network-configured MAC TA are unlikely to be aligned in time and periodicity. In fact, this is one reason that 3GPP introduced dedicated UE TA updates—to counter inefficient network TA updates due to extended RTT times.

For an NTN UE, one reason to apply gradual timing adjustment is to counter a sudden DL timing change due to instantaneous blockage of the best propagation path, for example (an issue that is of increasing interest due to the mmWave frequencies now in use). The minimum aggregate adjustment rate limits the UE to at least adjust its timing with Tp in every second; the maximum aggregate adjustment rate limits the UE to at most adjust its timing with Tq in every 200 ms. The values Tp and Tq may depend on sub carrier spacing configurations of the UL signals.

For an NTN UE, requirements should apply to the UE-specific TA estimation and update. One reason for this is because the UE-specific TA estimation is based on the UE GNSS and satellite ephemeris, in both of which sudden transitions may occur. Thus, the UE should estimate and update its specific TA and adjust its timing gradually, with predetermined minimum and maximum aggregate adjustment rates.

The applications of open or closed loop, or a combination thereof may depend on the network configurations. Closed loop here mainly corresponds to the R15 mechanism of network-configured MAC based TA updates, while open loop mainly corresponds to common TA and UE-specific TA.

Figure 4:
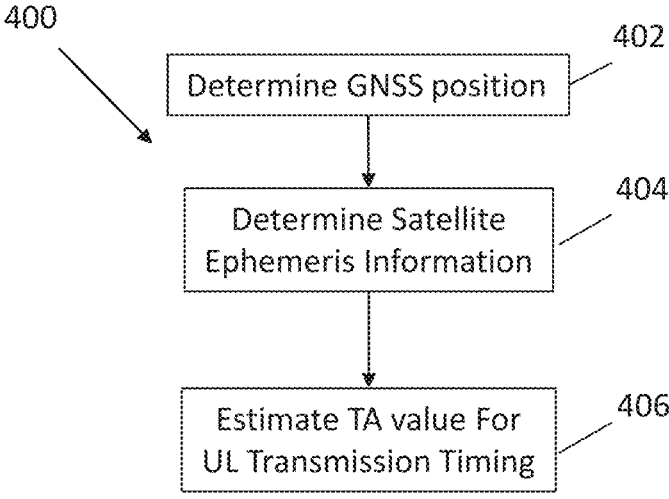
FIG. 4 illustrates a flowchart of determining a timing advance (TA) in accordance with some embodiments.

In some embodiments, the NTN UE may be configured to perform one or more of the processes described herein. FIG. 4 illustrates a flowchart of determining a TA in accordance with some embodiments. Additional operations may be present. The order of the operations shown in FIG. 4 may be different from that shown. In the method 400 of FIG. 4, at operation 402 the NTN UE may determine NTN UE position based on GNSS information. At operation 404, the NTN UE may determine satellite ephemeris information. Based upon the GNSS position and the satellite ephemeris information, the UE may estimate, at operation 406, one or more TA values, which include the UE-specific TA. The TA values may be estimated for one or more periods to achieve UE UL transmission timing. The periodicity of determining the TA can be configured from the network by broadcast (e.g., via a SIB) or dedicated signaling to the NTN UE. Once determined, the TA may then be used to transmit UL transmissions to the gNB through the satellite during the period.

In some embodiments, the UE initial transmission timing error is at most $\pm T_{e\_NTN}$ where the timing error limit value $T_{e\_NTN}$ is specified in Table 1. This applies when the transmission is the first transmission in a DRX cycle for PUCCH, PUSCH and SRS, is the PRACH transmission, or is an msgA transmission. The UE meets the $T_{e\_NTN}$ requirement for an initial transmission provided that at least one SSB is available at the UE during the last 160 ms. The reference point for the UE initial transmit timing control requirement is the downlink timing of the reference cell minus $(N_{TA}+N_{TA-offset}+N_{TA,common}+N_{TA,UE-specific})\times T_c$. The downlink timing is defined as the time when the first detected path (in time) of the corresponding downlink frame is received from the reference cell. $N_{TA}$ for PRACH is defined as 0. $(N_{TA}+N_{TA-offset}+N_{TA,common}+N_{TA,UE-specific})\times T_c$ (in $T_c$ units) for other channels is the difference between UE transmission timing and the downlink timing immediately after when the last timing advance was applied. $N_{TA}$ for other channels is not changed until next timing advance is received. The value of $N_{TA-offset}$ depends on the duplex mode of the cell in which the uplink transmission takes place and the frequency range (FR). $N_{TA-offset}$ is defined in Table 7.1.2-2.

TABLE 7.1C.2-1

| | $T_{e\_NTN}$ Timing Error Limit | | |
|---|---|---|---|
| Frequency Range | SCS of SSB signals (kHz) | SCS of uplink signals (kHz) | $T_e$ |
| 1 | 15 | 15 | $29*64*T_c$ |
| | | 30 | $24*64*T_c$ |
| | | 60 | N/A |
| | 30 | 15 | $24*64*T_c$ |
| | | 30 | $22*64*T_c$ |
| | | 60 | N/A |

Note 1:
$T_c$ is the basic timing unit

When the transmission is not the first transmission in a DRX cycle or there is no DRX cycle, and when the transmission is the transmission for PUCCH, PUSCH and SRS transmission, the UE is generally capable of changing the transmission timing according to the received downlink frame of the reference cell, the updating of $N_{TA,common}$ and the updating of $N_{TA,UE-specific}$.

Gradual Timing Adjustment

When the transmission timing error between the UE and the reference timing exceeds $\pm T_{e\_NTN}$ then the UE is required to adjust its timing to within $\pm T_{e\_NTN}$. The reference timing shall be $(N_{TA}+N_{TA-offset}+N_{TA,common}+N_{TA,UE-specific}) \times T_c$ before the downlink timing of the reference cell. All adjustments made to the UE uplink timing follows:

1) The maximum amount of the magnitude of the timing change, apart from a change of $N_{TA,UE-specific}$ due to satellite position update and $N_{TA,common}$ between the previous transmission and the current transmission, in one adjustment is $T_{q\_NTN}$.

2) The minimum aggregate adjustment rate, apart from a change of $N_{TA,UE-specific}$ due to satellite position update and $N_{TA,common}$ during the last one second, is $T_{p\_NTN}$ per second.

3) The maximum aggregate adjustment rate, apart from a change of $N_{TA,UE-specific}$ due to satellite position update and $N_{TA,common}$ during the last 200 ms, is $T_{q\_NTN}$ per 200 ms.

Where, the maximum autonomous time adjustment step $T_{q\_NTN}$ and the aggregate adjustment rate $T_{p\_NTN}$ are specified in Table 2.

TABLE 2

| $T_{q\_NTN}$ Maximum Autonomous Time Adjustment Step and $T_{p\_NTN}$ Minimum Aggregate Adjustment rate | | | |
|---|---|---|---|
| Frequency Range | SCS of uplink signals (kHz) | $T_{q\_NTN}$ | $T_{p\_NTN}$ |
| 1 | 15 | $[5.5]*64*T_c$ | $[5.5]*64*T_c$ |
| | 30 | $[5.5]*64*T_c$ | $[5.5]*64*T_c$ |
| | 60 | N/A | N/A |

NOTE:
$T_c$ is the basic timing unit

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a non-terrestrial network (NTN) user equipment (UE), the apparatus comprising:

processing circuitry to configure the NTN UE to:

determine a timing advance adjustment is to be applied for an uplink (UL) transmission to a $5^{th}$ generation NodeB (gNB) through a Global Navigation Satellite System (GNSS) satellite;

receive, from the gNB, a configuration of a periodicity for estimating a UE-specific timing advance (TA) based on GNSS position and satellite ephemeris information;

estimate the UE-specific TA at the periodicity provided by the configuration;

limit a change of the timing advance adjustment between a maximum aggregate adjustment rate and a minimum aggregate adjustment rate to establish a TA that is dependent on the UE-specific TA; and transmit, to the gNB through the GNSS satellite, the UL transmission using the TA; and a memory configured to store the TA.

2. The apparatus of claim 1, wherein the TA is further dependent on a common TA, an integer timing-advance $N_{TA}$, and a fixed offset $N_{TA,offset}$.

3. The apparatus of claim 1, wherein:

the minimum aggregate adjustment rate is Tp per second, the maximum aggregate adjustment rate is Tq per 200 ms, and Tp and Tq depend on a subcarrier spacing (SCS) of the UL transmission.

4. The apparatus of claim 1, wherein the processing circuitry further configures the NTN UE to adjust the TA based on a message from the gNB.

5. The apparatus of claim 4, wherein the message is a medium access control (MAC) control element (CE) message.

6. The apparatus of claim 1, wherein the processing circuitry further configures the NTN UE to receive, in a broadcast transmission from the gNB, an update periodicity to periodically update the TA.

7. The apparatus of claim 1, wherein the processing circuitry further configures the NTN UE to receive, in dedicated signaling from the gNB, an update periodicity to periodically update the TA.

8. The apparatus of claim 1, wherein the processing circuitry further configures the NTN UE to determine whether to apply open loop or closed loop TA updates dependent on a network configuration based on broadcast signaling from the gNB.

9. The apparatus of claim 1, wherein the processing circuitry further configures the NTN UE to determine whether to apply open loop or closed loop TA updates dependent on a network configuration based on dedicated signaling from the gNB.

10. The apparatus of claim 3, wherein the processing circuitry further configures the NTN UE to:

adjust the TA gradually toward an updated UE-specific TA value by limiting timing changes within the maximum and minimum aggregate adjustment rates, excluding changes due to satellite position updates, and after open loop TA updates are configured, autonomously estimate a UE-specific TA based on GNSS position and satellite ephemeris information without performing a TA procedure with the gNB.

11. The apparatus of claim 1, wherein the maximum aggregate adjustment rate and the minimum aggregate adjustment rate excluding changes to the timing advance due to satellite position updates and changes to a common timing advance ($N_{TA,common}$) between a previous uplink transmission and a current uplink transmission.

12. The apparatus of claim 1, wherein a configured periodicity for estimating the UE-specific TA is independent from a periodicity at which the gNB provides TA commands for a feeder link component of the TA.

13. The apparatus of claim 1, wherein the processing circuitry further configures the NTN UE to maintain a validity timer for the UE-specific TA based on a configured periodicity, and re-estimate the UE-specific TA upon expiration of the validity timer.

14. A non-transitory computer-readable storage medium that stores instructions for execution by one or more processors of a non-terrestrial network (NTN) user equipment (UE), the one or more processors to configure the NTN UE to, when the instructions are executed:

determine a timing advance adjustment is to be applied for an uplink (UL) transmission to a $5^{th}$ generation NodeB (gNB) through a Global Navigation Satellite System (GNSS) satellite;

receive, from the gNB, a configuration of a periodicity for estimating a UE-specific timing advance (TA) based on GNSS position and satellite ephemeris information;

estimate the UE-specific TA at the periodicity provided by the configuration;

limit a change of the timing advance adjustment between a maximum aggregate adjustment rate and a minimum aggregate adjustment rate to establish a TA that is dependent on the UE-specific TA; and transmit, to the gNB through the GNSS satellite, the UL transmission using the TA.

15. The medium of claim 14, wherein the TA is further dependent on a common TA, an integer timing-advance $N_{TA}$, and a fixed offset $N_{TA,offset}$.

16. The medium of claim 14, wherein:

the minimum aggregate adjustment rate is Tp per second, the maximum aggregate adjustment rate is Tq per 200 ms, and Tp and Tq depend on a subcarrier spacing (SCS) of the UL transmission.

17. The medium of claim 14, wherein the one or more processors further configure the NTN UE to, when the instructions are executed, adjust the TA based on a message from the gNB.

18. The medium of claim 17, wherein the message is a medium access control (MAC) control element (CE) message.

19. The medium of claim 14, wherein the one or more processors further configure the NTN UE to, when the instructions are executed, receive, in a broadcast transmission from the gNB, an update periodicity to periodically update the TA.

20. The medium of claim 14, wherein the one or more processors further configure the NTN UE to, when the instructions are executed, receive, in dedicated signaling from the gNB, an update periodicity to periodically update the TA.

* * * * *